United States Patent
Goslin (10) Patent No.: US 10,037,465 B2
(45) Date of Patent: Jul. 31, 2018

(54) SYSTEMS AND METHODS FOR GENERATING AUGMENTED REALITY ENVIRONMENTS

(71) Applicant: Disney Enterprises, Inc., Burbank, CA (US)

(72) Inventor: Michael P. Goslin, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/442,384

(22) Filed: Feb. 24, 2017

(65) Prior Publication Data

US 2017/0270698 A1   Sep. 21, 2017

Related U.S. Application Data

(60) Provisional application No. 62/310,098, filed on Mar. 18, 2016.

(51) Int. Cl.
*G06K 9/00* (2006.01)
*G06T 19/00* (2011.01)

(52) U.S. Cl.
CPC ........... *G06K 9/00664* (2013.01); *G05B 2219/39449* (2013.01); *G06T 19/006* (2013.01)

(58) Field of Classification Search
CPC ...... G06K 9/00664; G05B 2219/39449; G06T 19/006
See application file for complete search history.

(56) References Cited

U.S. PATENT DOCUMENTS

| | | | |
|---|---|---|---|
| 8,224,024 B2 | 7/2012 | Foxlin | |
| 8,542,906 B1 | 9/2013 | Persson | |
| 9,058,764 B1 | 6/2015 | Persson | |
| 9,070,194 B2 | 6/2015 | Lee | |
| 9,092,896 B2 | 7/2015 | Scavezze | |
| 9,105,210 B2 | 8/2015 | Lamb | |
| 2008/0266323 A1 | 10/2008 | Biocca | |
| 2012/0229508 A1 | 9/2012 | Wigdor | |
| 2015/0070387 A1 | 3/2015 | Schmalstieg | |

OTHER PUBLICATIONS

Statt, "Microsoft's HoloLens explained: How it works and why it's different" URL: http://www.cnet.com/news/microsoft-hololens-explained-how-it-works-and-why-its-different/ (9 pages) [retrieved Nov. 20, 2015].

Wilson et al., "Steerable Augmented Reality with the Beamatron", http://research.microsoft.com/en-us/um/people/benko/publications/2012/Beamatron.pdf , Oct. 10, 2012 (10 pages).

*Primary Examiner* — Maurice L. McDowell, Jr.
(74) *Attorney, Agent, or Firm* — Sheppard Mullin Richter & Hampton LLP (57) ABSTRACT

This disclosure relates to systems and methods for generating augmented reality environments. An augmented reality environment may be generated using physical tags placed throughout a real-world environment, for example, on real-world objects and/or surfaces. Identifying features of the tags may be detected. The presence of one or more particular tags may be determined by virtue of the detected identifying features. A computing platform may present or show views of the real-world and may overlay images of virtual object at locations that correspond to the tags present in the real-world environment.

20 Claims, 5 Drawing Sheets

| Tag | Tag ID | Real-world Surface and/ or object | Virtual object Experience type 1 | Experience type 2 |
|---|---|---|---|---|
| First tag | • #<br>• Chair_image<br>• Chair_shape<br>• Red | Chair | Tree | Astronaut |
| Second tag | • ✦<br>• Wall_image<br>• Wall_shape<br>• Green | Wall | Rainforest landscape | Spaceship |
| ⋮ | ⋮ | ⋮ | ⋮ | ⋮ |

SYSTEMS AND METHODS FOR GENERATING AUGMENTED REALITY ENVIRONMENTS

FIELD

This disclosure relates to systems and methods for generating augmented reality environments.

BACKGROUND

In some augmented reality applications, detailed spatial mapping of a real-world environment may be performed. Spatial mapping may include determinations of one or more of dimensions of the real-world environment, one or more real-world surfaces and/or objects present in the real-world environment, and/or other information. The detailed spatial mapping may allow for augmented reality images (e.g., overlay images depicting virtual objects) to be positioned on a display (with respect to real-world objects shown on the display) to a high degree of accuracy. However, the detailed spatial mapping of the real-world environment comes at a high cost associated with one or both of high-tech device requirements and processing power requirements. For example, three-dimensional scanners are a type of device that generate output signals conveying a three-dimensional point cloud and/or other information. The point cloud may represent a set of data points that are coordinates of surface detected by the three-dimensional scanner. Three-dimensional scanners are generally expensive and require substantial processing power.

SUMMARY

One aspect of the disclosure relates to a system configured to generate augmented reality environments. An augmented reality environment may include views of virtual content, in the form of digital images, superimposed over a view of the real-world. The disclosure contemplates a low-cost and/or low-tech solution to spatial mapping of a real-world environment. In particular, spatial mapping may be accomplished through the use of one or more physical tags that may be placed throughout an environment.

A physical tag may be associated with one or more specific real-world surfaces and/or objects. The physical tag may embody the appearance of an associated real-world surface and/or object. The physical tag may further be associated with one or more virtual objects. The physical tag may include one or more identifying features. The one or more identifying features of the physical tag may be detected within the real-world environment (e.g., via an imaging device having an imaging sensor, and/or other devices). The presence of the physical tag may be determined based on detection of the one or more identifying features of the physical tag. Determining presence of the physical tag based on the detected one or more identifying features may facilitate determining one or more of a real-world surface and/or object associated with the physical tag, a location of the physical tag and/or associated real-world surface and/or object within the real-world environment, one or more virtual objects associated with the physical tag, and/or other information about the physical tag. The location of the real-world surface and/or object in the real-world environment may be correlated to a display location on a display that shows the real-world environment (e.g., a head-up display screen, a mobile device display screen, and/or other display). An overlay image of the virtual object associated with the physical tag may be generated and presented at the display location to occlude the view of the real-world surface and/or object, thereby providing the augmented reality environment. In some implementations, a physical tag may comprise a sticker and/or other components.

The system may include one or more of one or more physical tags, non-transitory electronic storage, one or more physical processors, one or more image sensors, and/or other components.

Individual ones of the one or more physical tags may be configured to be placed on individual real-world surfaces and/or objects. An individual physical tag may be related to one or more specific real-world surfaces and/or objects. Individual ones of the physical tags may be configured with one or more identifying features. By way of non-limiting example, an identifying feature may include one or more of indicia disposed thereon, a shape, a color, and/or other features. Indicia may include one or more of a glyph, a word, a sentence, a mark, a bar code, a quick response code, and/or other indicia.

The non-transitory electronic storage may be configured to store association information and/or other information. The association information may specify one or more of associations between individual physical tags and individual virtual objects, associations between individual physical tags and individual real-world surfaces and/or objects related to the individual physical tags, and/or other information. By way of non-limiting illustration, association information may specify an association between a first physical tag and/or other physical tags and a first real-world surface and/or object and/or other real-world surfaces and/or objects, and/or other associations. By way of non-limiting illustration, association information may specify an association between a first physical tag, a first virtual object, a second virtual object, and/or other virtual objects.

The one or more image sensors may be configured to generate output signals conveying visual information within a field-of-view of the one or more image sensors. Visual information may define and/or represent the real-world environment within the field-of-view. Visual information may define and/or represent one or more real-world surface and/or objects present in the real-world environment. By way of non-limiting illustration, visual information may include information suitable to reproduce one or more of an image, an image sequence, and/or a video representation of the real-world environment.

The one or more physical processors may be configured by machine-readable instructions. Executing the machine-readable instructions may cause the one or more physical processor to facilitate generating augmented reality environments. The machine-readable instructions may include one or more computer program components. The computer program components may include one or more of an imaging component, a detection component, an identification component, a location component, an overlay component, a presentation component, and/or other components.

The imaging component may be configured to determine, from the sensor output of one or more imaging sensors, visual information representing a real-world environment.

The detection component may be configured to obtain visual information from imaging component, and/or other information. The detection component may be configured to detect, from the visual information, identifying features of one or more physical tags present in the real-world environment within the field-of-view. Detected identifying features may include a first identifying feature and/or other identifying features of the first physical tag and/or other physical tags.

The identification component may be configured to determined, from the detected identifying features, presence of the one or more physical tags in the real-world environment within the field-of-view. By way of non-limiting illustration, the presence of the first physical tag may be determined based on the detection of the first identifying feature of the first physical tag.

The location component may be configured to determine individual locations of individual real-world surfaces and/or objects related to individual ones of the one or more physical tags on which individual ones of the one or more physical tags may be placed. The locations of the individual real-world surfaces and/or objects may be determined based on locations of physical tags present within the real-world environment. The determined locations may include a first location of the first real-world surface and/or object, and/or other real-world surfaces and/or objects.

The overlay component may be configured to determine, based on the association information, individual virtual objects associated with individual ones of the one or more physical tags present in the real-world environment within the field-of-view. The determined virtual objects may include the first virtual object associated with the first physical tag, and/or other virtual objects associated with other physical tags.

The overlay component may be configured to generate individual overlay images of the individual virtual objects. The overlay images may be configured to be presented on a display. The generated overlay images may include a first overlay image and/or other overlay images. The first overlay image may be an image of the first virtual object.

The presentation component may be effectuate presentation of the individual overlay images and/or other information on a display to generate an augmented reality environment. The display may be configured to show a view of the real-world environment within the field-of-view. In some implementations, the display may be a transparent, or semi-transparent, display. In such implementations, the display may not effectuate presentation of the views of the real-world environment. Instead, the user may simply view through the display to view the real-world environment first hand. In some implementations, the display may be configured to effectuate presentation of views of the real-world environment based on the obtained visual information. In such implementations, display may comprise a display screen of a mobile computing platform, and/or other type of display of other computing platforms.

The presentation component may be configured such that individual overlay images may be presented at individual display locations of the display. Individual display locations may correspond to the locations of the individual real-world surfaces and/or objects that are shown in the views of the real-world environment. The presentation of the individual overlay images at the individual display locations may be configured to facilitate occlusion, by the individual overlay images, of the individual real-world surfaces and/or objects in the real-world environment shown via the display. By way of non-limiting illustration, the first overlay image may be presented on a first display location of the display to occlude the first real-world surface and/or object positioned shown at the first location via the display.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
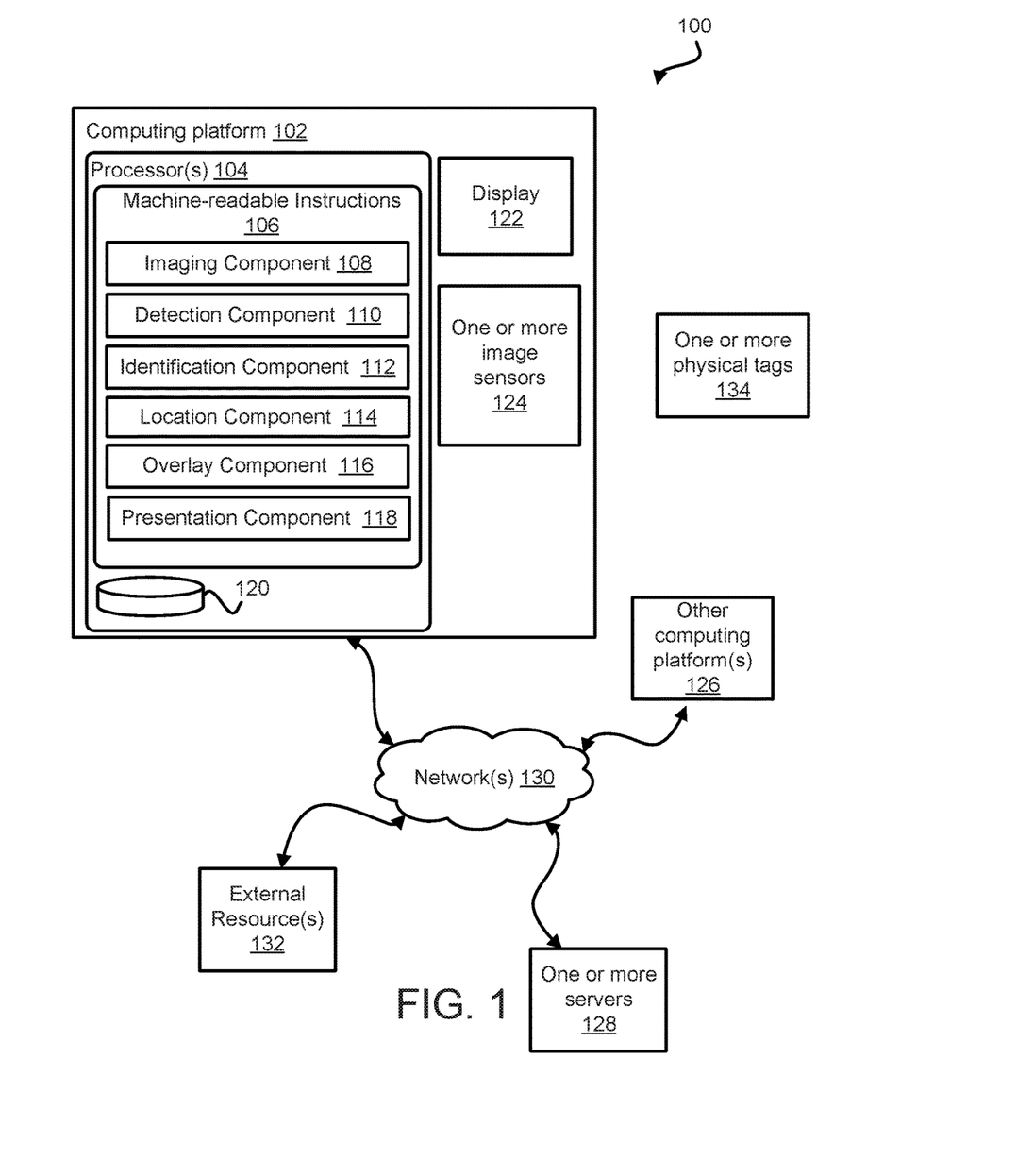
FIG. 1 illustrates a system configured to generate augmented reality environments, in accordance with one or more implementations.

FIG. 1 illustrates a system 100 configured to generate augmented reality environments, in accordance with one or more implementations. The system 100 may include one or more of one or more computing platforms (e.g., a computing platform 102 and/or one or more other computing platforms 126), one or more servers 128, one or more physical tags 134, one or more external resources 132, and/or other information.

Individual ones of the one or more physical tags may be configured to be placed on individual real-world surfaces and/or objects, and/or at other locations. An individual physical tag may be related to one or more specific real-world surfaces and/or objects. In some implementations, a physical tag may embody a physical appearance of a related real-world surface and/or object. Individual ones of the physical tags may be configured with one or more identifying features. By way of non-limiting example, an identifying feature may include one or more of indicia disposed thereon, a shape, an image, a color, and/or other features. Indicia may include one or more of a glyph, a word, a sentence, a mark, and/or other indicia.

In some implementations, an identifying feature may convey a relationship between a physical tag and a real-world surface and/or object. By way of non-limiting example, an identifying feature may comprise a word that may be a name of a related real-world surface and/or object. By way of non-limiting example, a physical tag may have the word "chair" written, printed, imprinted, engraved, and/or other disposed on a surface of the physical tag. The word "chair" may serve as one or both of a technique to convey the relationship of the physical tag with a "chair" object in the real-world and/or as a feature of physical tag that may be used to determine presence of the physical tag within the real-world environment.

An individual physical tag may comprise a physical object configured to be placed on a real-world object and/or surface. By way of non-limiting example, a physical object may comprise one or more of a sticker, a toy figurine, a puck, a disk, a patch, a sticky note, a coin, a vinyl cut-out, and/or other physical objects. In some implementations, a toy figurine may embody the physical appearance of a related real-world surface and/or object. In some implementations, a sticker may include an image that may depict the physical appearance of a related real-world surface and/or object.

Figure 2:
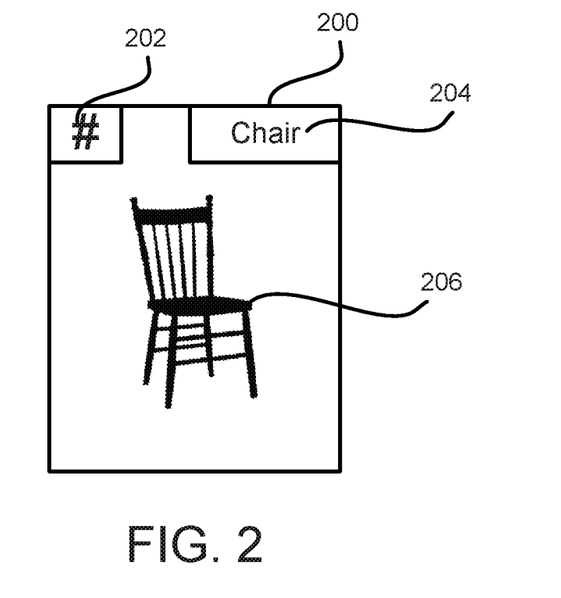
FIG. 2 illustrates an exemplary implementation of a physical tag.
Figure 3:
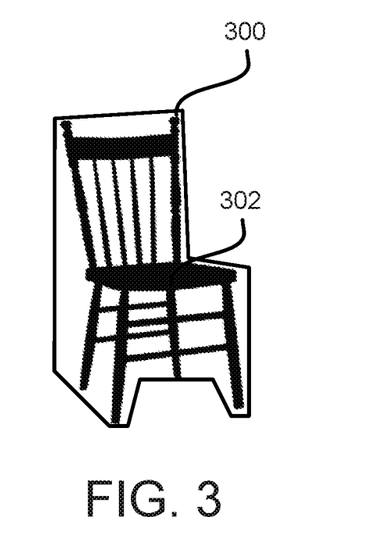
FIG. 3 illustrates another exemplary implementation of a physical tag.

FIG. 2 and FIG. 3 illustrate exemplary implementations of physical tags. In FIG. 2, physical tag 200 may comprise a sticker and/or other physical object. The physical tag 200 may comprise at least one surface including an adhesive layer and/or coating. A surface of physical tag 200 having an adhesive layer and/or coating may be provided with a removable backing layer (not shown in FIG. 2). A user may peel off the backing layer to expose the adhesive layer and/or coating when placing physical tag 200 on a surface and/or object. The physical tag 200 may be adhesively and removably attached to a surface and/or object.

It is noted that although physical tag 200 is shown being substantially rectangular in shape, this is for illustrative purposes only. For example, in other implementations, physical tag 200 may have a shape of one or more of circular, oval, square, star-shaped, other multi-sided polygon, and/or other shapes.

The physical tag 200 may include one or more identifying features. The one or more identifying features may include one or more of a glyph 202, a word 204, an image 206, and/or other identifying features. In some implementations, the one or more identifying features may further convey a relationship of physical tag 200 with a real-world physical surface and/or object. By way of non-limiting example, physical tag 200 may be related to a chair and/or one or more other physical objects (e.g., by virtue of the word "chair" being disposed thereon and/or by virtue of an image of a chair being disposed thereon).

FIG. 3 illustrates another implementations of a physical tag 300. The physical tag 300 may include one or more identifying features. The one or more identifying features may include one or more of a shape (e.g., "chair-shaped"), an image 302, and/or other identifying features. In some implementations, the one or more identifying features may further convey a relationship of physical tag 200 with a real-world physical surface and/or object. By way of non-limiting example, physical tag 200 may be related to a chair and/or one or more other physical objects (e.g., by virtue of the physical tag 300 being chair-shaped, and/or by virtue of an image of a chair being disposed thereon).

It is noted that the depictions and corresponding descriptions of physical tags 200 and 300 in FIG. 2 and FIG. 3, respectively, are provided for illustrative purposes only and are not to be considered limiting. By way of non-limiting example, in other implementations, physical tags may be configured in other forms, having different shapes, different identifying features, and/or other features than those shown.

Returning to FIG. 1, computing platform 102 may include one or more of one or more physical processors 104, non-transitory electronic storage 120, a display 122, one or more image sensors 124, and/or other components. It is noted that one or more features and/or functions described herein with respect to computing platform 102 may be similarly attributed to individual ones of one or more other computing platforms 126.

Computing platform 102 may include one or more of a mobile computing platform, a client device, a smartphone, a cell phone, a laptop computer, a game console, a head-mounted display device, a heads-up display device, a projector, and/or other computing platforms.

The non-transitory electronic storage 120 may be configured to store association information and/or other information. The association information may include one or more of associations between individual physical tags and individual virtual objects, associations between individual physical tags and individual real-world surfaces and/or objects related to the individual physical tags, associations between physical tags and one or more identifying features of the physical tags, and/or other information. By way of non-limiting example, the association information may include an association between a first physical tag (not shown in FIG. 1) and/or other physical tags and a first real-world surface and/or object and/or other real-world surfaces and/or objects, and/or other associations. By way of non-limiting example, the association information may include an association between the first physical tag and/or other physical tags and a first virtual object and/or other virtual objects, and/or other associations.

In some implementations, individual augmented reality environments may be associated with individual experiences types. Individual virtual objects displayed in accordance with the augmented reality environment may be associated with the individual experience types. In some implementations, an experience type of an augmented reality environment may be associated with a theme. A theme may include a unifying subject of the augmented reality environment. The virtual objects associated with an individual experience type may include expressions of an individual theme of the individual experience type. In some implementations, a theme may include one or more of a time period (e.g., the 1920's), a location (e.g., outer space, Disneyland, and/or other locations), a brand, a movie (e.g., Star Wars), a character, an individual (real or imaginary), a color scheme, and/or other themes.

In some implementations, association information may further include associations between individual virtual objects and individual experience types of the individual augmented reality environments. By way of non-limiting example, association information may further include an association of the first physical tag with a second virtual object. The association information may further include associations of one or more of the first virtual object with a first experience type, the second virtual object with a second experience type, and/or other associations. The first virtual object may embody a theme of the first experience type. The second virtual object may embody a theme of the second experience type.

Figure 7:
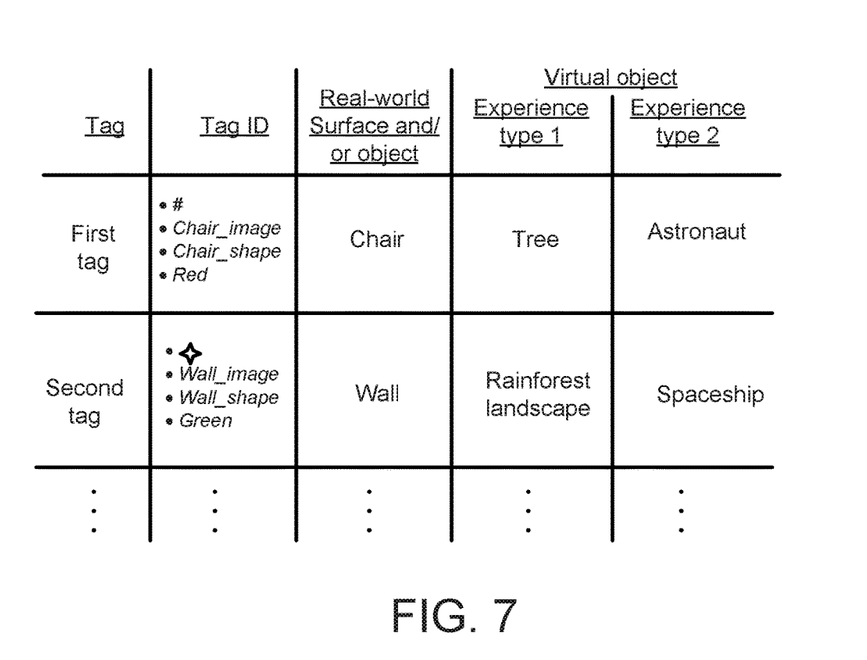
FIG. 7 illustrates a graphical representation of association information stored by non-transitory electronic storage.

FIG. 7 illustrates a non-limiting graphical representation of association information stored by non-transitory electronic storage 120 (FIG. 1). The association information may include one or more of associations between individual physical tags and individual virtual objects, associations between individual physical tags and individual real-world surfaces and/or objects related to the individual physical tags, associations between physical tags and one or more identifying features of the physical tags, and/or other information.

By way of non-limiting illustration, a first tag (labeled "first tag" in FIG. 7) may be associated with one or more of a first set of identifying features, a first real-world object and/or surface, a first virtual object, a second virtual object, and/or other information. The first real-world object and/or surface may be a "chair" and/or other objects and/or surfaces. The first virtual object may be a "tree" and/or other virtual objects. The second virtual object may be an "astronaut" and/or other virtual objects. The first virtual object may be associated with a first experience type (e.g., indicated by the heading "Experience Type 1" in FIG. 7) and/or other experience types. The second virtual object may be associated with a second experience type (e.g., indicated by the heading "Experience Type 2" in FIG. 7) and/or other experience types. The first set of identifying features may include one or more of indicia (e.g., the "#" character), an image (e.g., an image of a "chair" as indicated in the label "chair_image"), a shape of the first tag (e.g., a shape of a "chair" as indicated in the label "chair_shape"), a color (e.g., the color red), and/or other features.

By way of non-limiting illustration, a second tag (labeled "second tag" in FIG. 7) may be associated with one or more of a second set of identifying features, a second real-world object and/or surface, a third virtual object, a fourth virtual object, and/or other information. The second real-world object and/or surface may be a "wall" and/or other objects and/or surfaces. The third virtual object may be a "rainforest landscape" and/or other virtual objects. The fourth virtual object may be a "spaceship" and/or other virtual objects. The third virtual object may be associated with the first experience type and/or other experience types. The fourth virtual object may be associated with the second experience type and/or other experience types. The second set of identifying features may include one or more of indicia (e.g., a "star" character), an image (e.g., an image of a "wall" as indicated in the label "wall_image"), a shape of the first tag (e.g., a shape of a "wall" as indicated in the label "wall_shape"), a color (e.g., the color green), and/or other features.

In some implementations, a theme of "Experience type 1" may be "the outdoors." In some implementations, a theme of "Experience type 2" may be "outer space."

Returning to FIG. 1, in some implementations, display 122 may include one or more of a head-mounted display, an optical head-mounted display, a see-through display, an optical see-through display, a video see-through display, a visor, eyeglasses, sunglasses, a projected display, a display screen of a mobile device, and/or other displays.

Display 122 may be configured to present visual information. In some implementations, visual information presented via display may include one or more of a view of a real-world environment (e.g., reproduced on display 122 using on visual information conveyed by sensor output of one or more image sensors 124), images, overlay images, and/or other information. Presentation via display 122 may be facilitated by one or more processors 104. By way of non-limiting example, presentation may be facilitated by a graphics processing unit (GPU) and/or other processing components of one or more processors 104.

Display 122 may be configured to show a view of the real-world environment within a field-of-view of the real-world. In some implementations, display 122 may be a transparent, or semi-transparent, display (e.g., a see-through display). In such implementations, display 122 may not effectuate presentation of the views of the real-world environment. Instead, the user may simply view through display 122 to view the real-world environment first hand. In some implementations, display 122 may be configured to effectuate presentation of views of the real-world environment based on the obtained visual information. In such implementations, display 122 may comprise a display screen of a mobile computing platform, and/or other type of display.

One or more image sensors 124 may be configured to generate output signals conveying visual information within a field-of-view of one or more image sensors 124. Visual information derived from output signals of one or more image sensors 124 may define and/or represent the real-world environment within the field-of-view. In some implementations, one or more sensors 124 may be carried on display 122 and/or other part of computing platform 102 such that the field-of-view of image sensor 124 may be a function of a position and/or orientation of display 122 and/or computing platform 102.

Visual information may correspond to one or more of an image, an image sequence, a video, and/or other representations of a real-world environment. When one or more physical tags may be present within the field-of-view of one or more image sensors 124, visual information may include one or more of an image, a video, and/or other representation of the real-world environment including the one or more physical tags. The one or more image sensors 124 may include one or more of a charge-coupled device sensor, an active pixel sensor, a complementary metal-oxide semiconductor sensor, an N-type metal-oxide-semiconductor sensor, and/or other image sensors.

The one or more physical processors 104 may be configured by machine-readable instructions 106. Executing the machine-readable instructions 106 may cause the one or more physical processors 104 to facilitate generating augmented reality environments. The machine-readable instructions 106 may include one or more computer program components. The computer program components may include one or more of an imaging component 108, a detection component 110, an identification component 112, a location component 114, an overlay component 116, a presentation component 118, and/or other components.

The imaging component 108 may be configured to determine, from sensor output of one or more imaging sensors 124, visual information representing a real-world environment within a field-of-view of the real-world environment, and/or other information.

The detection component 110 may be configured to obtain visual information from imaging component 108 and/or other information from other components. The detection component 110 may be configured to detect, from visual information and/or other information, identifying features of one or more physical tags present in the real-world environment within the field-of-view. Detection may be accomplished by one or more object and/or character recognition techniques. Such techniques may include one or more of optical character recognition (OCR), edge matching, Scale-invariant feature transform (SIFT), Speeded Up Robust Features (SURF), computer-vision techniques, and/or other techniques. By way of non-limiting example, detection component 110 may be configured to detect one or more of a first identifying feature and/or other identifying features of a first physical tag, a second identifying feature and/or other identifying features of a second physical tag, and/or other identifying features of one or more other physical tags.

The identification component 112 may be configured to determine, from detected identifying features of physical tags, presence of one or more physical tags in the real-world environment. The determination of presence of one or more physical tags may be based on stored association information and/or other information. For example, as presented herein, association information may include associations between physical tags and the identifying features of the physical tags. The one or more physical tags determined as present in the real-world environment may include one or more of the first physical tag based on detection of the first identifying feature, the second physical tag based on detection of the second identifying feature, and/or other physical tags.

The location component 114 may be configured to determine individual locations of individual real-world surfaces and/or objects related to individual ones of the one or more physical tags on which individual ones of the one or more physical tags may be placed. In some implementations, locations of real-world surface and/or objects may be determined and/or estimated based on determining locations of individual physical tags whose presence in the real-world may have been determined. By way of non-limiting example, location component 114 may be configured to determine one or more of a first location of the first real-world surface and/or object associated with the first physical tag present in the real-world environment, a second location of a second real-world surface and/or object associated with the second physical tag present in the real-world environment, and/or other real-world surfaces and/or objects. In some implementations, locations may be expressed as coordinates within a coordinate system. The coordinates may be three-dimensional coordinates within a three-dimensional coordinate system.

In some implementations, individual locations of individual real-world surfaces and/or objects may be determined from visual information derived from sensor output of one or more sensors 124, and/or other information. By way of non-limiting illustration, locations may be determined from visual information (e.g., an image, image sequence, and/or video of the real-world environment) using one or more of bundle adjustment, inference, triangulation, and/or other techniques.

In some implementations, location component 114 may be configured to determine distances between real-world surfaces and/or objects associated with physical tags determined as being present in the real-world environment. In some implementations, distances may be determined based on locations of the physical tags. Determining distances between physical tags may facilitate spatial mapping of a real-world environment.

The overlay component 116 may be configured to determine, based on association information and/or other information, individual virtual objects associated with individual ones of the one or more physical tags determined as present within the real-world environment. In some implementations, determination of a virtual object to present in an augmented reality environment may be based on a current experience type of the augmented reality environment. In some implementations, an experience type may be determined by one or more of a provider of the augmented reality environment, the user, based on a location of the user, and/or by other techniques.

By way of non-limiting example, overlay component 116 may be configured to determine the first virtual object associated with the first physical tag to presented in an augmented reality environment based on a current experience type being the first experience type. By way of non-limiting example, overlay component 116 may be configured to determine the second virtual object associated with the first physical tag to presented in an augmented reality environment based on the current experience type being the second experience type.

The overlay component 116 may be configured to generate individual overlay images of the individual virtual objects. In some implementations, the overlay images may be configured to be presented on display 122. The overlay images may include a first overlay image and/or other overlay images. The first overlay image may be an image of the first virtual object.

The presentation component 118 may be configured to effectuate presentation of individual overlay images on display 122 to generate an augmented reality environment. The display 122 may be configured to concurrently show overlay images and a view of the real-world environment. In some implementations, display 122 may be a transparent, or semi-transparent, display. In such implementations, display 122 may not effectuate presentation of the views of the real-world environment. Instead, the user may simply view through display 122 to view the real-world environment and/or one or more overlay images. In some implementations, display 122 may be configured to effectuate presentation of views of the real-world environment based on visual information derived from output signals of one or more image sensors 124. In such implementations, display 122 may comprise a display screen of a mobile computing platform, and/or other type of display of other computing platforms.

The presentation component 118 may be configured such that individual overlay images may be presented at individual display locations of display 122. Individual display locations may correspond to the locations of the individual real-world surfaces and/or objects that are shown in the views of the real-world environment. The presentation of the individual overlay images at the individual display locations may be configured to facilitate occlusion, by the individual overlay images, of the individual real-world surfaces and/or objects in the real-world environment shown via display 122.

In some implementations, presentation component 118 may be configured to obtain display specification information and/or other information. Display specification information may specify correspondences between individual real-world locations within the real-world environment and individual display locations on display 122. In some implementations, display information may depend on one or more of dimensions of display 122, the field-of-view of one or more image sensors 124, and/or other information.

By way of non-limiting example, presentation component 118 may be configured to effectuate presentation of the first overlay image on a first display location of the display to occlude the first real-world surface and/or object positioned shown at the first location via display 122.

In some implementations, presentation component 118 may be configured to effectuate presentation of one or more other overlay images in accordance with an augmented reality environment. In some implementations, the one or more other overlay images may correspond to one or more of a game, an animated video, and/or other types of augmented reality environments. In some implementations, information associated with presentation of one or more other overlay images and/or other aspects of the augmented reality environment may be obtained from one or more servers 128. For example, one or more servers 128 may comprise a game server, an augmented reality environment server, and/or other types of servers. In some implementations, the one or more other overlay images presented on display 122 may be determined independently from one or more physical tags being identified within the field-of-view of the real-world environment.

In some implementations, one or more other overlay images presented on display 122 may be dynamic and/or static. Dynamic overlay images may be perceived to experience locomotion within the real-world environment. Static overlay images may not experience locomotion within the real-world environment. By way of non-limiting example, a static overlay image may be perceived to be stationary at a location within the real-world environment as experienced by the user via display 122.

By way of non-limiting example, presentation component 118 may be configured to effectuate presentation of a second overlay image on display 122 in accordance with the augmented reality environment. The second overlay image may be presented independently from presence of one or more physical tags being determined within the field-of-view of the real-world environment. The second overlay image may be configured to be one or both of static within the view of the real-world environment presented on display 122 and/or dynamic within the view of the real-world environment presented on display 122. By way of non-limiting example, the second overlay image may be dynamic such that the second overlay image is perceived to experience locomotion within the field-of-view of the real-world environment presented on display 122. In some implementations, perceived locomotion may include one or more of traversing over the real-world environment, interacting with real-world objects in the real-world environment, interacting with other virtual objects, and/or other locomotion. By way of non-limiting illustration, locomotion experienced by the second overlay image may comprise traversing through the real-world environment. In some implementations, the second overlay image may traverse behind other overlay images (e.g., the first overlay image, and/or other overlay images). The second overlay image may be occluded by the first overlay image when the second overlay image traverses behind the first overlay image.

Figure 4:
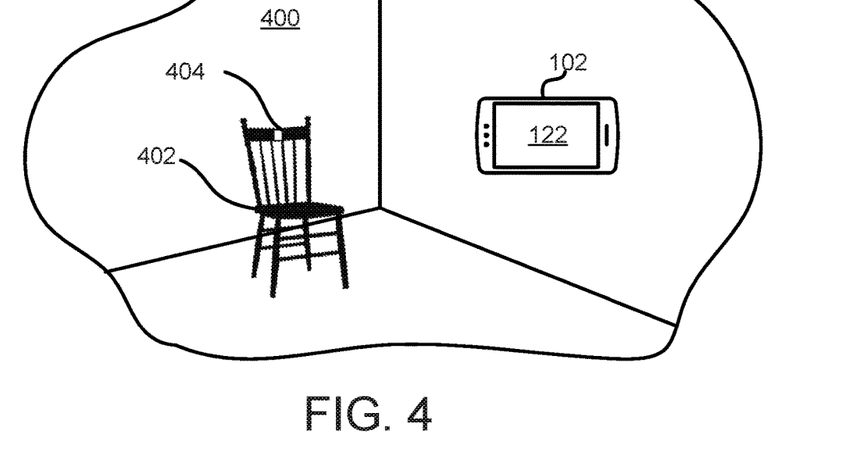
FIG. 4 illustrates an exemplary implementation of the system of FIG. 1.

FIG. 4 illustrates a real-world environment 400 showing an implementation of system 100 (FIG. 1). The computing platform 102 may be implemented as a mobile computing platform and/or other computing platforms present within real-world environment 400. The computing platform 102 may have a display 122 and/or other components. The real-world environment 400 may include a first real-world object 402, and/or other real-world objects and/or surfaces. The first real-world object 402 may comprise a chair and/or other real-world objects and/or surfaces. The first physical object 402 may have a first physical tag 404 (see, e.g., FIG. 2) disposed thereon. The first physical tag 404 may be related to first real-world object 402. By way of non-limiting illustration, first physical tag 404 may depict an image of chair and/or may have other identifying features.

Figure 5:
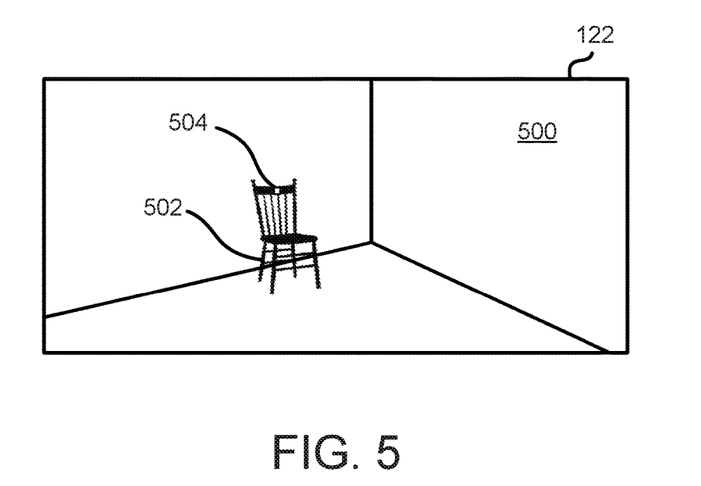
FIG. 5 illustrates a display of a computing platform showing the real-world environment of FIG. 4.
Figure 6:
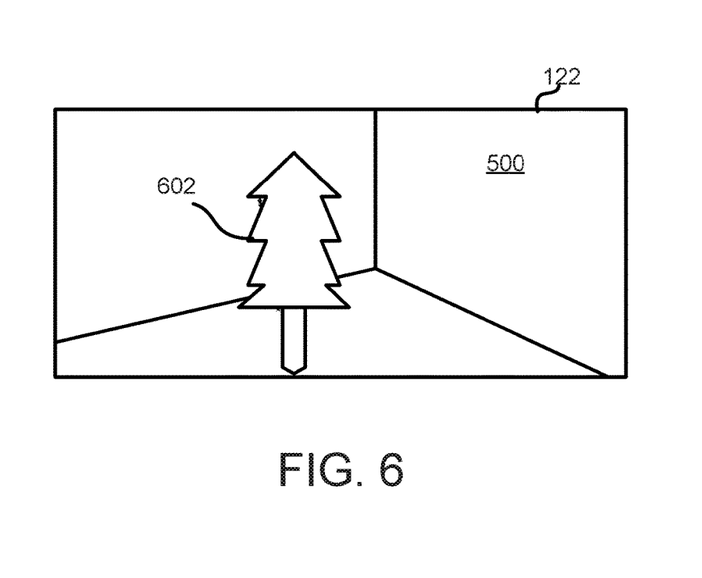
FIG. 6 illustrates the display of FIG. 5 showing a augmented reality environment generated in accordance with one or more implementations of the system presented herein.

FIG. 5 and FIG. 6 show exemplary views of an augmented reality environment presented on display 122 of computing platform 102. FIG. 5 shows a view 500 of real-world environment 400 of FIG. 4. In some implementations, if display 122 is a see-through display, view 500 may be a real view of real-world environment 400 of FIG. 4. In some implementations, if display 122 is a display screen of a mobile computing platform, view 500 may be a representation of real-world environment 400 that may be reproduced on display 122 using visual information conveyed from sensor output of one or more imaging sensors 124 of computing platform 102 (see, e.g., FIG. 1).

FIG. 6 shows an overlay image 602 being presented on display 122 at a display location that corresponds with the location of the first real-world object (occluded by overlay image 602) in real-world environment 500.

Returning to FIG. 1, computing platform 102, one or more other computing platforms 126, one or more servers 128, and/or external resources 132 may be operatively linked via one or more electronic communication links. For example, such electronic communication links may be established, at least in part, via one or more networks 130, such as the Internet and/or other networks. It will be appreciated that this is not intended to be limiting and that the scope of this disclosure includes implementations in which computing platform 102, one or more other computing platforms 126, one or more servers 128, and/or external resources 132 may be operatively linked via some other communication media.

The external resources 132 may include sources of information, hosts, and/or providers of virtual spaces outside of system 100, external entities participating with system 100, external entities for player-to-player communications, and/or other resources. In some implementations, some or all of the functionality attributed herein to external resources 132 may be provided by resources included in system 100.

Computing platform 102 may include communication lines or ports to enable the exchange of information with a network, other computing platforms, and/or other entities. Illustration of computing platform 102 in FIG. 1 is not intended to be limiting. The computing platform 102 may include a plurality of hardware, software, and/or firmware components operating together to provide the functionality attributed herein to computing platform 102.

Electronic storage 120 may comprise electronic storage media that electronically stores information. The electronic storage media of electronic storage 120 may include one or both of system storage that is provided integrally (i.e., substantially non-removable) with computing platform 102 and/or removable storage that is removably connectable to computing platform 102 via, for example, a port or a drive. A port may include a USB port, a firewire port, and/or other port. A drive may include a disk drive and/or other drive. Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 120 may include one or more virtual storage resources (e.g., cloud storage, a virtual private network, and/or other virtual storage resources). Electronic storage 120 may store software algorithms, information determined by processor(s) 104, information received from server(s) 128, information received from one or more other computing platforms 126, and/or other information that enables computing platform 102 to function as described herein.

Processor(s) 104 is configured to provide information-processing capabilities in computing platform 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108, 110, 112, 114, 116, and/or 118. Processor(s) 104 may be configured to execute components 108, 110, 112, 114, 116, and/or 118 by software; hardware; firmware; some combination of software, hardware, and/or firmware; and/or other mechanisms for configuring processing capabilities on processor(s) 104.

It should be appreciated that although components 108, 110, 112, 114, 116, and/or 118 are illustrated in FIG. 1 as being co-located within a single processing unit, in implementations in which processor(s) 104 includes multiple processing units, one or more of components 108, 110, 112, 114, 116, and/or 118 may be located remotely from the other components. The description of the functionality provided by the different components 108, 110, 112, 114, 116, and/or 118 described above is for illustrative purposes and is not intended to be limiting, as any of components 1108, 110, 112, 114, 116, and/or 118 may provide more or less functionality than is described. For example, one or more of components 108, 110, 112, 114, 116, and/or 118 may be eliminated, and some or all of its functionality may be provided by other ones of components 108, 110, 112, 114, 116, 118, and/or other components. As another example, processor(s) 104 may be configured to execute one or more additional components that may perform some or all of the functionality attributed below to one of components 108, 110, 112, 114, 116, and/or 118.

Figure 8:
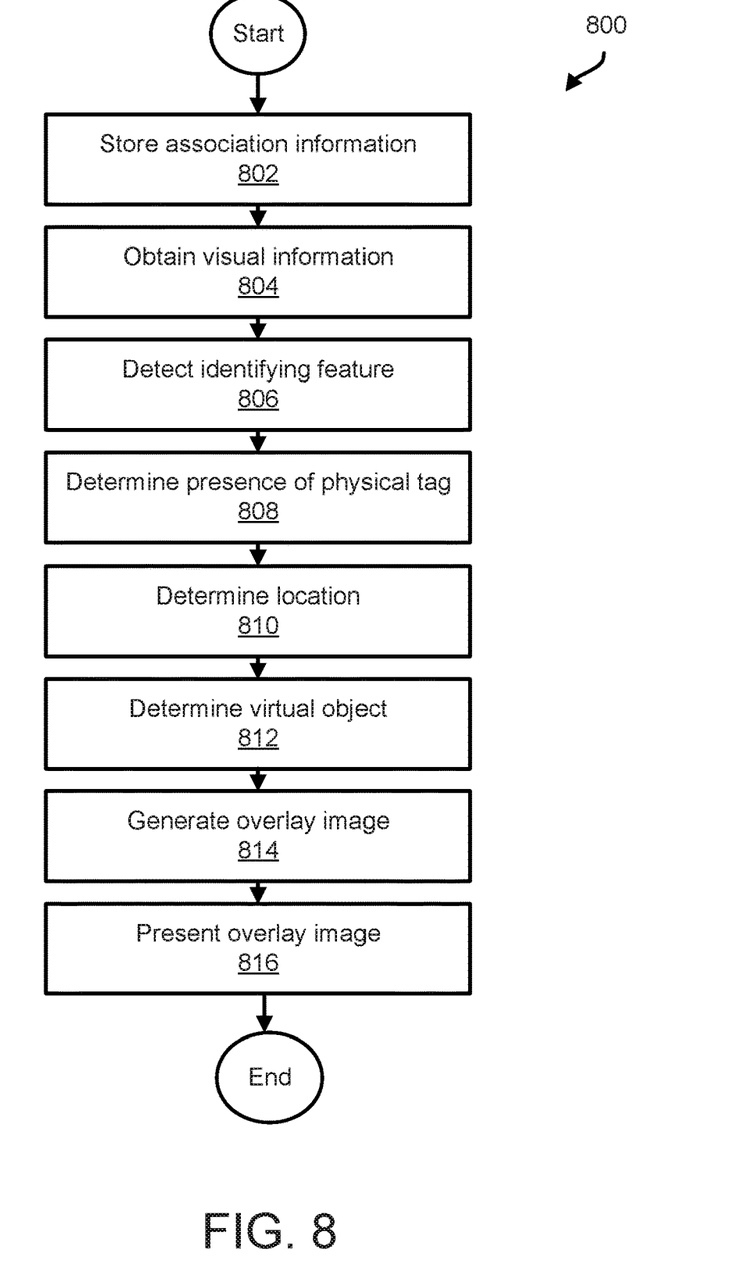
FIG. 8 illustrates a method of generating an augmented reality environment, in accordance with one or more implementations.

FIG. 8 illustrates a method 800 of generating an augmented reality environment. The operations of method 800 presented below are intended to be illustrative. In some embodiments, method 800 may be accomplished with one or more additional operations not described, and/or without one or more of the operations discussed. Additionally, the order in which the operations of method 800 are illustrated in FIG. 8 and described below is not intended to be limiting.

In some embodiments, method 800 may be implemented in a computing platform and/or a computer system comprising one or more of one or more processing devices (e.g., a digital processor, an analog processor, a digital circuit designed to process information, an analog circuit designed to process information, a state machine, and/or other mechanisms for electronically processing information), storage media storing machine-readable instructions, one or more physical tags, and/or other components. Individual physical tags may be configured to be placed on individual real-world surfaces and/or objects. An individual physical tag being related to a specific individual real-world surface and/or object. Individual ones of the physical tags being configured with identifying features. The one or more processing devices may include one or more devices executing some or all of the operations of method 800 in response to instructions stored electronically on electronic storage media. The one or more processing devices may include one or more devices configured through hardware, firmware, and/or software to be specifically designed for execution of one or more of the operations of method 800.

At an operation 802, association information and/or other information may be stored. Association information may include associations between one or more of individual physical tags and individual virtual objects, individual physical tags and individual real-world surfaces and/or objects related to the individual physical tags, and/or other associations. By way of non-limiting example, the association information may include associations between one or more of a first physical tag and a first virtual object, the first physical tag and a first real-world surface and/or object, and/or other associations. In some implementations, operation 802 may be performed using non-transitory electronic storage the same or similar to non-transitory electronic storage 120 (shown in FIG. 1 and described herein).

At an operation 804, visual information representing a real-world environment within a field-of-view of the real-world environment may be obtained. In some implementations, operation 804 may be performed by one or more physical processors executing an imaging component the same as or similar to imaging component 108 (shown in FIG. 1 and described herein).

At an operation 806, identifying features of one or more physical tags present in the real-world environment within the field-of-view may be detected from the visual information. The detection may include detecting first identifying feature of a first physical tag. In some implementations, operation 806 may be performed by one or more physical processors executing a detection component the same as or similar to detection component 110 (shown in FIG. 1 and described herein).

At an operation 808, presence of one or more physical tags within the real-world environment may be determined from the detected identifying features. The determination may be based on the association information. By way of non-limiting example, presence of the first physical tag may be determined from the first identifying feature. In some implementations, operation 808 may be performed by one or more physical processors executing an identification component the same as or similar to the identification component 112 (shown in FIG. 1 and described herein).

At an operation 810, individual locations of individual real-world surfaces and/or objects may be determined. The determinations may include determining a first location of a first real-world surface and/or object on which the first physical tag may be placed. In some implementations, operation 810 may be performed by one or more physical processors executing a location component the same as or similar to the location component 114 (shown in FIG. 1 and described herein).

At an operation 812, individual virtual objects associated with individual ones of the one or more physical tags present in the real-world environment within the field-of-view may be determined based on the association information. The determinations may include determining the first virtual object associated with the first physical tag. In some implementations, operation 812 may be performed by one or more physical processors executing an overlay component the same as or similar to the overlay component 116 (shown in FIG. 1 and described herein).

At an operation 814, individual overlay images of the individual virtual objects may be generated. The generated overlay images may include a first overlay image and/or other overlay images. The first overlay image may be an image of the first virtual object. In some implementations, operation 814 may be performed by one or more physical processors executing an overlay component the same as or similar to the overlay component 116 (shown in FIG. 1 and described herein).

At an operation 816, presentation may be effectuated of the individual overlay images on a display to generate the augmented reality environment. The display may show a view of the real-world environment within the field-of-view. Individual overlay images may be presented at individual display locations of the display that correspond to the locations of the individual real-world surfaces and/or objects. The presentation of the individual overlay images at the individual display locations may facilitate occlusion by the individual overlay images of the individual real-world surfaces and/or objects in the real-world environment within the field-of-view shown via the display. The presentation may include presenting the first overlay image on a first display location of the display to occlude the first real-world surface and/or object positioned shown at the first location via the display. In some implementations, operation 816 may be performed by one or more physical processors executing a presentation component the same as or similar to the presentation component 118 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to generate augmented reality environments, the system comprising:
    one or more physical tags configured to be placed on individual real-world surfaces and/or objects, individual physical tags being related to specific individual real-world surfaces and/or objects, the individual physical tags having individual identifying features, the one or more physical tags including a first physical tag having a first identifying feature;
    non-transitory electronic storage configured to store association information, the association information specifying associations between the individual physical tags and individual virtual objects, and associations between the individual physical tags and the specific individual real-world surfaces and/or objects related to the individual physical tags, such that the association information specifies an association between the first physical tag and a first virtual object, and an association between the first physical tag and a first real-world surface and/or object; and
    one or more physical processors configured by machine-readable instructions to:
        obtain visual information representing a real-world environment within a field-of-view of the real-world environment;
        determine, from the visual information, presence of one or more physical tags in the real-world environment within the field-of-view based on detecting identifying features in the real-world environment, presence of the first physical tag being determined based on the detection of the first identifying feature;
        determine individual locations of the individual real-world surfaces and/or objects related to individual ones of the one or more physical tags present in the real-world environment, including determining a first location of the first real-world surface and/or object associated with the first physical tag;
        determine, based on the association information, individual virtual objects associated with individual physical tags present in the real-world environment within the field-of-view, including determining the first virtual object is associated with the first physical tag;
        generate individual overlay images of the individual virtual objects, the overlay images including a first overlay image, the first overlay image being an image of the first virtual object; and
        effectuate presentation of the individual overlay images on a display to generate an augmented reality environment, the display showing a view of the real-world environment within the field-of-view, wherein individual overlay images are presented at individual display locations of the display that correspond to the locations of the individual real-world surfaces and/or objects within the field-of-view, wherein the presentation of the individual overlay images at the individual display locations facilitates occlusion, by the individual overlay images, of the individual real-world surfaces and/or objects in the real-world environment within the field-of-view shown via the display, such that the first overlay image is presented on a first display location of the display to occlude the first real-world surface and/or object shown via the display at the first location in the real-world environment.

2. The system of claim 1, wherein individual virtual objects are associated with individual experience types, wherein the association information further includes an association of the first physical tag with a second virtual object, wherein the first virtual object is associated with a first experience type, and the second virtual object is associated with a second experience type, and wherein the one or more physical processors are further configured by machine-readable instructions such that determining individual virtual objects comprises:
    determining individual experience types for individual augmented reality environments, including determining the first experience type for the augmented reality environment; and
    determining the individual virtual objects based on the individual experience types, such that the first virtual object and not the second virtual object is determined based the determination of the first experience type for the augmented reality environment.

3. The system of claim 1, wherein the one or more physical processors are further configured by machine-readable instructions to:
    detect, from the visual information, identifying features of individual physical tags present in the real-world environment within the field-of-view, the detected identifying features including the first identifying feature;
    detect, from the visual information, a second identifying feature;
    determine, from the detected second identifying feature, presence of a second physical tag in the real-world environment within the field-of-view;
    determine a second location of a second real-world surface and/or object associated with the second physical tag; and
    determine a distance between the first location and the second location.

4. The system of claim 1, wherein the display is a transparent display of a head-mounted display device.

5. The system of claim 1, wherein the display is a display screen of a mobile computing platform.

6. The system of claim 1, wherein the one or more physical processors are further configured by machine-readable instructions to:
    obtain sensor output from an imaging sensor, the imaging sensor having a sensor field-of-view; and
    determine, from the sensor output, the visual information, wherein the field-of-view of the environment represented by the visual information corresponds to the sensor field-of-view.

7. The system of claim 1, wherein the one or more physical processors are further configured by machine-readable instructions to:
effectuate presentation of a second overlay image on the display, the second overlay image being presented independently from presence of one or more physical tags being determined in the real-world environment within the field-of-view, and wherein the second overlay image is configured to be static within the view of the real-world environment presented via the display or dynamic within the view of the real-world environment presented via the display.

8. The system of claim 7, wherein the second overlay image is dynamic such that the second overlay image is perceived to experience locomotion in the real-world environment presented via the display, and wherein the locomotion experienced by the second overlay image comprises traversing behind first overlay image, such that the second overlay image is occluded by the first overlay image when the second overlay image traverses behind the first overlay image.

9. The system of claim 1, wherein the non-transitory electronic storage, the one or more physical processors, and the display are included in a mobile computing platform.

10. The system of claim 1, wherein the first physical tag is a sticker.

11. A method of generating augmented reality environments, the method being implemented in a system comprising one or more physical processors, non-transitory storage media storing machine-readable instructions, and one or more physical tags, individual physical tags being configured to be placed on individual real-world surfaces and/or objects, individual physical tags being related to specific individual real-world surfaces and/or objects, the individual physical tags having individual identifying features, the one or more physical tags including a first physical tag having a first identifying feature, the method comprising:
storing association information, the association information specifying associations between the individual physical tags and individual virtual objects, and associations between the individual physical tags and the specific individual real-world surfaces and/or objects related to the individual physical tags, such that the association information specifies an association between the first physical tag and a first virtual object, and an association between the first physical tag and a first real-world surface and/or object; and
obtaining visual information representing a real-world environment within a field-of-view of the real-world environment;
determining, from the visual information, presence of one or more physical tags in the real-world environment within the field-of-view of the real-world environment based on detecting identifying features in the real-world environment, presence of the first physical tag being determined based on the detection of the first identifying feature;
determine individual locations of the individual real-world surfaces and/or objects related to individual ones of the one or more physical tags present in the real-world environment, including determining a first location of the first real-world surface and/or object associated with the first physical tag;
determining, based on the association information, individual virtual objects associated with individual physical tags present in the real-world environment within the field-of-view, including determining the first virtual object is associated with the first physical tag;
generating individual overlay images of the individual virtual objects, the overlay images including a first overlay image, the first overlay image being an image of the first virtual object; and
effectuating presentation of the individual overlay images on a display to generate an augmented reality environment, the display showing a view of the real-world environment within the field-of-view, wherein individual overlay images are presented at individual display locations of the display that correspond to the locations of the individual real-world surfaces and/or objects within the field-of-view, wherein the presentation of the individual overlay images at the individual display locations facilitates occlusion, by the individual overlay images, of the individual real-world surfaces and/or objects in the real-world environment within the field-of-view shown via the display, such that the first overlay image is presented on a first display location of the display to occlude the first real-world surface and/or object shown via the display at the first location in the real-world environment.

12. The method of claim 11, wherein individual virtual objects are associated with individual experience types, wherein the association information further includes an association of the first physical tag with a second virtual object, wherein the first virtual object is associated with a first experience type, and the second virtual object is associated with a second experience type, and wherein the method further comprises:
determining individual experience types for individual augmented reality environments, including determining the first experience type for the augmented reality environment; and
determining the individual virtual objects based on the individual experience types, such that the first virtual object and not the second virtual object is determined based the determination of the first experience type for the augmented reality environment.

13. The method of claim 11, further comprising:
detecting, from the visual information, identifying features of individual physical tags present in the real-world environment within the field-of-view, the detected identifying features including the first identifying feature;
detecting, from the visual information, a second identifying feature;
determining, from the detected second identifying feature, presence of a second physical tag in the real-world environment within the field-of-view;
determining a second location of a second real-world surface and/or object associated with the second physical tag; and
determining a distance between the first location and the second location.

14. The method of claim 11, wherein the display is a transparent display of a head-mounted display device.

15. The method of claim 11, wherein the display is a display screen of a mobile computing platform.

16. The method of claim 11, further comprising:
obtaining sensor output from an imaging sensor, the imaging sensor having a sensor field-of-view; and
determining, from the sensor output, the visual information, wherein the field-of-view of the environment represented by the visual information corresponds to the sensor field-of-view.

17. The method of claim 11, further comprising:
effectuating presentation of a second overlay image on the display, the second overlay image being presented independently from presence of one or more physical tags being determined in the real-world environment within the field-of-view, and wherein the second overlay image is configured to be static within the view of the real-world environment presented via the display or dynamic within the view of the real-world environment presented via the display.

18. The method of claim 17, wherein the second overlay image is dynamic such that the second overlay image is perceived to experience locomotion in the real-world environment presented via the display, and wherein the locomotion experienced by the second overlay image comprises traversing behind first overlay image, such that the second overlay image is occluded by the first overlay image when the second overlay image traverses behind the first overlay image.

19. The method of claim 11, wherein the non-transitory electronic storage, the one or more physical processors, and the display are included in a mobile computing platform.

20. The method of claim 11, wherein the first physical tag is a sticker.

* * * * *